(12) United States Patent
Ghiasi (10) Patent No.: US 7,676,158 B2
(45) Date of Patent: Mar. 9, 2010

(54) METHOD AND SYSTEM FOR OPTIMUM CHANNEL EQUALIZATION FROM A SERDES TO AN OPTICAL MODULE

(75) Inventor: Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 951 days.

(21) Appl. No.: 11/268,246

(22) Filed: Nov. 7, 2005

(65) Prior Publication Data
US 2007/0104490 A1   May 10, 2007

(51) Int. Cl.
*H04B 10/12* (2006.01)
*H04B 10/04* (2006.01)

(52) U.S. Cl. .................. 398/147; 398/158; 398/159; 398/193; 398/194; 398/199

(58) Field of Classification Search .................. 398/147, 398/193, 194, 158, 159, 199
See application file for complete search history.

(56) References Cited

U.S. PATENT DOCUMENTS

| | | | | |
|---|---|---|---|---|
| 6,687,432 B2 * | 2/2004 | Schemmann et al. | .......... | 385/24 |
| 7,058,311 B1 * | 6/2006 | Islam et al. | .................. | 398/140 |
| 7,147,387 B2 * | 12/2006 | Aronson et al. | ............... | 385/92 |
| 7,199,681 B2 * | 4/2007 | Amirtharajah et al. | ....... | 333/130 |
| 7,321,612 B2 * | 1/2008 | Tonietto et al. | ............. | 375/219 |
| 2002/0167703 A1 * | 11/2002 | Merritt | ........................ | 359/173 |
| 2003/0112896 A1 * | 6/2003 | Raghavan et al. | ............ | 375/322 |
| 2006/0034358 A1 * | 2/2006 | Okamura | ...................... | 375/219 |

* cited by examiner

*Primary Examiner*—Ken N Vanderpuye
*Assistant Examiner*—Daniel G Dobson
(74) *Attorney, Agent, or Firm*—McAndrews, Held & Malloy, Ltd.

(57) ABSTRACT

Certain aspects of a method and system for optimum channel equalization between a host Serializer-Deserializer (SerDes) and an optical module may compensate and reduce dispersion loss along an electrical transmit path of a transmitter and an optical transmit path coupled to the transmitter via pre-emphasis. The data degradation as a result of the dispersion loss along the electrical transmit path of the transmitter and the optical transmit path coupled to the transmitter may be recovered by equalizing signals received via an electrical receive path of a receiver communicatively coupled to the transmitter.

16 Claims, 13 Drawing Sheets

METHOD AND SYSTEM FOR OPTIMUM CHANNEL EQUALIZATION FROM A SERDES TO AN OPTICAL MODULE

CROSS-REFERENCE TO RELATED APPLICATIONS/INCORPORATION BY REFERENCE

The present application is a continuation-in-part of application Ser. No. 10/418,035 filed on Apr. 17, 2003, which makes reference to, claims priority to and claims benefit from U.S. Provisional Patent Application Ser. No. 60/397,599 filed on Jul. 22, 2002.

FIELD OF THE INVENTION

Certain embodiments of the invention relate to channel equalization. More specifically, certain embodiments of the invention relate to a method and system for optimum channel equalization from a Serializer-Deserializer (SerDes) to an optical module.

BACKGROUND OF THE INVENTION

High speed fiber optic systems may be used in various communication applications, for instance in telecommunication over long transmission distances. A telecommunication network may be classified into various levels such as subscriber networks, regional networks and national networks. The national networks, for example, may exist between different cities where there is a greater demand for higher transmission speeds, for example, above 5 Gbits/sec. In the national networks, for example, dispersion may limit the transmission speeds between transmitters and receivers. Optical dispersion is a fundamental problem for high-speed gigabit networks and is of particular importance as bit rates exceed 2.4 Gbits/sec, for example.

Intersymbol interference (ISI) may also be a problem in digital communications in bandwidth-limited links. The ISI over a communication link may be the dominant power penalty in the link power budget and effectively sets the achievable data rate or transmission distance. The main source of ISI in a fiber-optic system is signal pulse broadening due to fiber dispersion. There may be various types of dispersion in a fiber-optic system, which may comprise modal dispersion, chromatic dispersion and polarization mode dispersion, for example. In a multimode fiber, different mode groups have different velocities, which is called modal dispersion. Chromatic dispersion may be caused by different wavelengths of light having different velocities. The polarization mode dispersion, which may be due to different velocities of different polarizations, may be neglected in multimode fibers.

In order to reduce the dispersion effect, several methods have been proposed and implemented in both electrical and optical domains. The main criteria for a good dispersion reduction method are small power penalty or loss, good integration with current networks, low cost, and adaptability. Dispersion is usually time varying due to environmental change such as temperature variation and is related to fiber length.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for optimum channel equalization from a SerDes to an optical module, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for optimum channel equalization between a host Serializer-Deserializer (SerDes) and an optical module may comprise reducing dispersion loss along an electrical transmit path of a transmitter and an optical transmit path coupled to the transmitter via pre-emphasis. Signal degradation resulting from the dispersion loss along the electrical transmit or receive path of the host SerDes and the optical module may be compensated by equalizing signals received via an electrical receive path of a receiver communicatively coupled to the transmitter.

Figure 1:
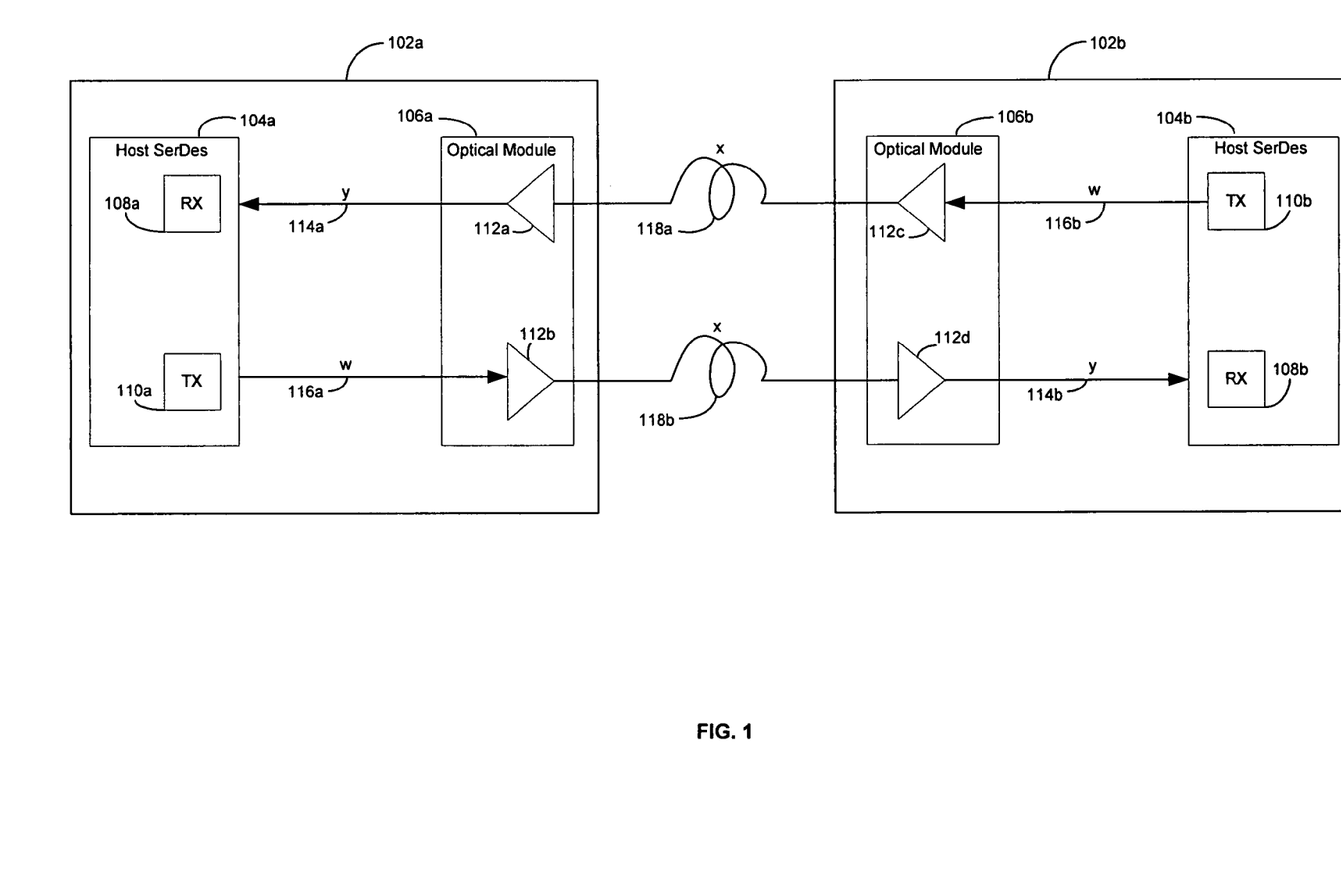
FIG. 1 is a block diagram illustrating electrical channel equalization in an optical communication circuit, in accordance with an embodiment of the invention.

FIG. 1 is a block diagram illustrating electrical channel equalization in an optical communication circuit, in accordance with an embodiment of the invention. Referring to FIG. 1, there is shown a plurality of host boards 102a and 102b, a forward optical path x 118a and a reverse optical path x 118b. The host board 102a comprises a host serializer-deserializer (SerDes) 104a, an optical module 106a, a forward electrical transmit path w 116a and a reverse electrical receive path y 114a. The host board 202 may be coated with a trace material, for example, 8"-12" FR4 trace material. The host SerDes 104a comprises a receiver RX 108a and a transmitter TX 110a. The optical module 106a comprises a plurality of optical amplifiers 112a and 112b. The host board 102b comprises a host SerDes 104b, an optical module 106b, a reverse electrical transmit path w 116b and a forward electrical receive path y 114b. The host SerDes 104b comprises a receiver RX 108b and a transmitter TX 110b. The optical module 106a comprises a plurality of optical amplifiers 112c and 112d.

The forward optical communication link comprises the transmitter TX 110a in the host SerDes 104a, the forward electrical transmit path w 116a, the optical amplifier 112b in the optical module 106a, the forward optical path x 118b, the optical amplifier 112d in the optical module 106b, the forward electrical receive path y 114b and the receiver RX 108b in the host SerDes 104b. The plurality of optical modules 106a and 106b may be either fixed or pluggable modules. When the optical module 106a or 106b is inserted, a nonlinear element may be introduced in the link. The nonlinear element may not be compensated for by using only a receive equalizer. The link may be divided into three segments. For example, the transmit electrical channel may comprise the transmitter TX 110a in the host SerDes 104a and the forward electrical transmit path w 116a. The optical channel may comprise the optical amplifier 112b in the optical module 106a, the forward optical path x 118b and the optical amplifier 112d in the optical module 106b. The receive electrical channel may comprise the forward electrical receive path y 114b and the receiver RX 108b in the host SerDes 104b. The transmitter TX 110a in the host SerDes 104a and the transmitter TX 110b in the host SerDes 104b may be adapted to compensate for dispersion loss by pre-emphasis. The receiver RX 108a in the host SerDes 104a and the receiver RX 108b in the host SerDes 104b may be adapted to compensate for dispersion loss by equalization. The reverse optical communication link comprises the transmitter TX 110b in the host SerDes 104b, the reverse electrical transmit path w 116b, the optical amplifier 112c in the optical module 106b, the reverse optical path x 118a, the optical amplifier 112a in the optical module 106a, the reverse electrical receive path y 114a and the receiver RX 108a in the host SerDes 104a.

The transmitter TX 110a may limit the FR4 transmission loss to, for example, 7 dB. The applied pre-emphasis may be categorized into different groups based on the channel length and the associated dispersion loss. For example, the applied pre-emphasis may be set to LOW for a dispersion loss of about 3 dB or less, for example. The applied pre-emphasis may be set to MEDIUM for a dispersion loss of about 3 dB-5 dB, for example. The applied pre-emphasis may be set to HIGH for a dispersion loss of about 5 dB-7 dB, for example. The applied pre-emphasis may be set to OFF if no pre-emphasis is used for compensation of dispersion loss. The pre-emphasis setting may have a minimum impact on jitter and is adapted to improve transmitter jitter performance. The receiver RX 108a may limit the FR4 transmission loss to, for example, about 7 dB.

The host SerDes 104a and/or 104b may be adapted to calculate the applied pre-emphasis by categorizing the dispersion loss along at least one of the first electrical path, for example, the forward electrical transmit path w 116a and the first optical path, for example, the forward optical path x 118b. The host SerDes 104a may be adapted to optimize the applied pre-emphasis by looping back the first electrical path, for example, the forward electrical transmit path w 116a through the optical module 106a. The first electrical path, for example, the forward electrical transmit path w 116a may be looped back to the host SerDes 104a via the reverse electrical receive path y 114a, if the dispersion loss along the first electrical path, for example, the forward electrical transmit path w 116a is similar to the dispersion loss along the second electrical path, for example, the forward electrical receive path y 114b. The host SerDes 104a may be adapted to optimize the applied pre-emphasis based on monitoring a channel inter-symbol interference (ISI) along at least one of the first electrical path, for example, the forward electrical transmit path w 116a and the second electrical path, for example, the forward electrical receive path y 114b. The host SerDes 104a may be adapted to optimize the applied pre-emphasis by receiving the monitored channel ISI.

Figure 2A:
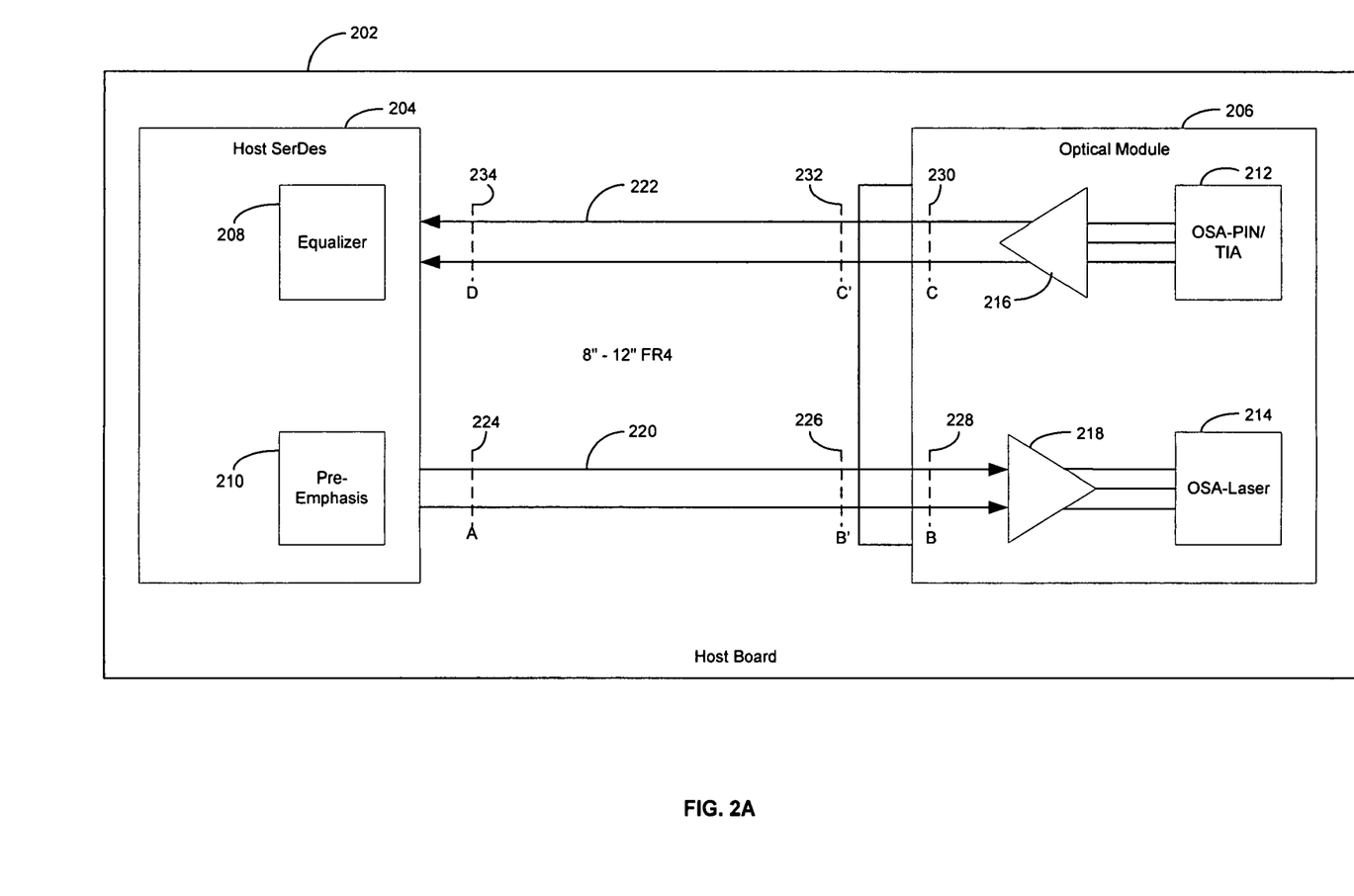
FIG. 2A is a block diagram illustrating a small form factor pluggable (SFP) architecture and its compliance points, in accordance with an embodiment of the invention.

FIG. 2A is a block diagram illustrating a small form factor pluggable (SFP) architecture and its compliance points, in accordance with an embodiment of the invention. Referring to FIG. 2A, there is shown a host board 202. The host board 202 comprises a host SerDes 204, an optical module 206, an electrical transmit path 220 and an electrical receive path 222. The host SerDes 204 comprises a pre-emphasis block 210 and an equalizer block 298. The optical module 206 may also be known as a small form factor pluggable (SFP) module or device. The optical module 206 comprises a plurality of laser diode (LD) amplifiers LDA 216 and LDA 218, an Optical Society of America (OSA) transimpedance amplifier (TIA) OSA-TIA 212 and an OSA laser 214.

The host board 202 may be coated with a trace material, for example, 8"-12" FR4 trace material. The pre-emphasis block 210 may comprise suitable logic, circuitry and/or code that may be adapted to compensate for dispersion loss in the electrical transmit path 220. The equalizer block 208 may comprise suitable logic, circuitry and/or code that may be adapted to compensate for dispersion loss in the electrical receive path 222.

The laser diode amplifier LDA 218 may comprise suitable logic and/or circuitry that may be adapted to amplify or boost the electrical signal received from the host SerDes 204 and transmit it to the OSA laser 214. The OSA laser 214 may comprise suitable logic and/or circuitry that may be adapted to convert the received amplified electrical signal to an optical signal and transmit the optical signal. The OSA-TIA 212 may comprise suitable logic, circuitry and/or code that may be adapted to convert a received optical signal into an electrical signal and transmit the electrical signal to the LDA 216. The laser diode amplifier LDA 216 may comprise suitable logic, circuitry and/or code that may be adapted to amplify or boost the electrical signal received from the OSA-TIA 212 and transmit the amplified electrical signal to the host SerDes 204.

A plurality of compliance points may be defined on the host board 202. The compliance point A 224 may represent the output of the transmitter in the host SerDes 204. The compliance point B' 226 may represent the input to the SFP or optical module 206. The compliance point B 228 may represent the input to the laser diode amplifier LDA 218. The compliance point C 230 may represent the output from the laser diode amplifier LDA 216. The compliance point C' 232 may represent the output from the SFP or optical module 206. The compliance point D 234 may represent the input to the receiver in the host SerDes 204.

Figure 2B:
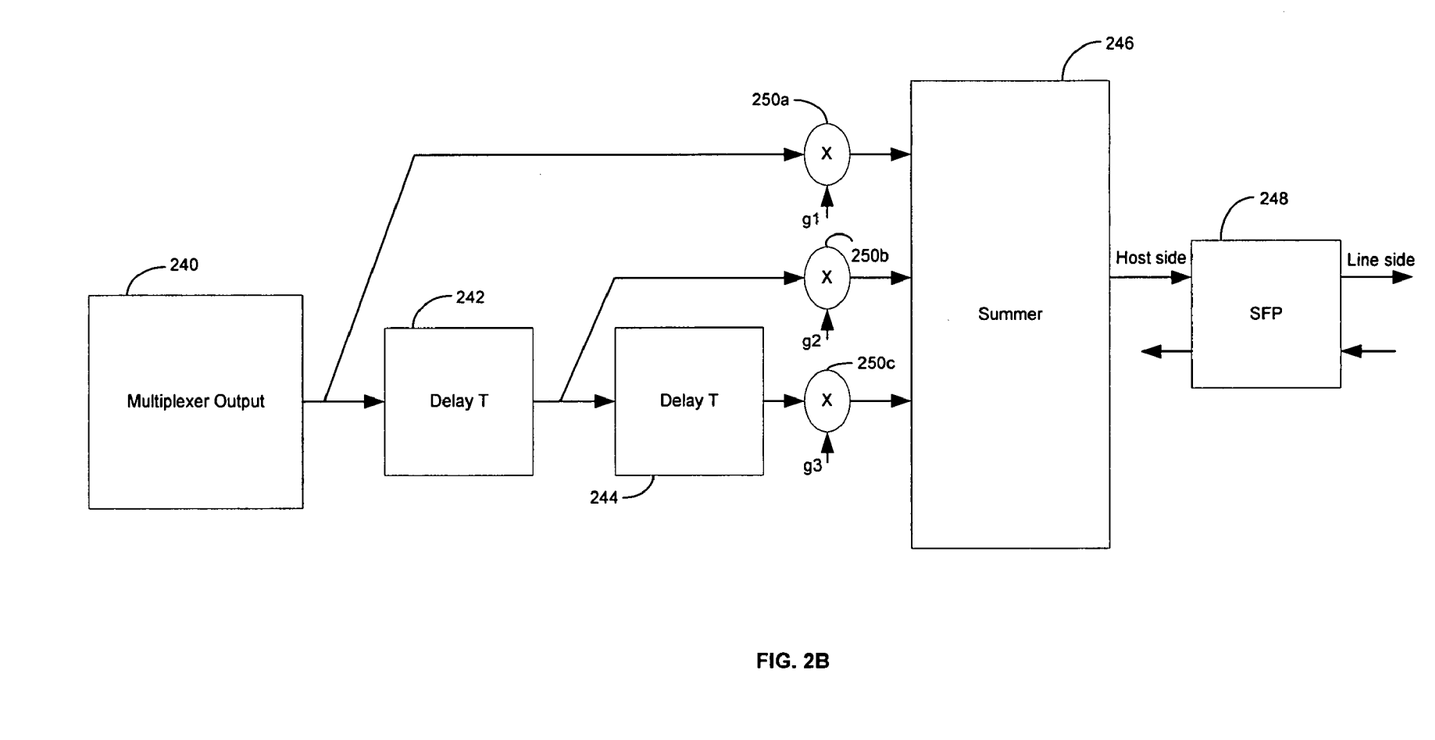
FIG. 2B is a block diagram illustrating the pre-emphasis architecture in a serializer-deserializer (SerDes), in accordance with an embodiment of the invention.

FIG. 2B is a block diagram illustrating the pre-emphasis architecture in a Serializer-Deserializer (SerDes), in accordance with an embodiment of the invention. Referring to FIG. 2B, there is shown a multiplexer block 240, a plurality of delay blocks 242 and 244, a plurality of multipliers 250a, 250b and 250c, a summer block 246 and a SFP 248.

The plurality of delay blocks 242 and 244 may comprise suitable logic, circuitry and/or code that may be adapted to delay an incoming signal by at least one time period T. The plurality of multipliers 250a, 250b and 250c may comprise suitable logic, circuitry and/or code that may be adapted to receive a plurality of signals and generate a multiplied output of the received signals to the summer block 246. The summer block 246 may comprise suitable logic, circuitry and/or code that may be adapted to sum the received signals from the plurality of multipliers 250a, 250b and 250c and generate an output to the SFP 248. The SFP 248 may comprise suitable logic, circuitry and/or code that may be adapted to receive an input signal from the summer block 246 on the host side and generate an output to the line side. The received input on the host side may be a function of the output of the multiplexer block 240.

The pre-emphasis block 210 (FIG. 2A) may be designed as a feed forward equalizer (FFE) filter, for example. The output of the summer block 246 may be represented by the following relationship:

$$Y(t)=g1*x(t-1)+g2*x(t)+g3*x(t+1)$$

where g1, g2 and g3 are weight coefficients. The weight coefficients g1, g2 and g3 may be adjusted based on an expected printed circuit board (PCB) trace loss.

Figure 2C:
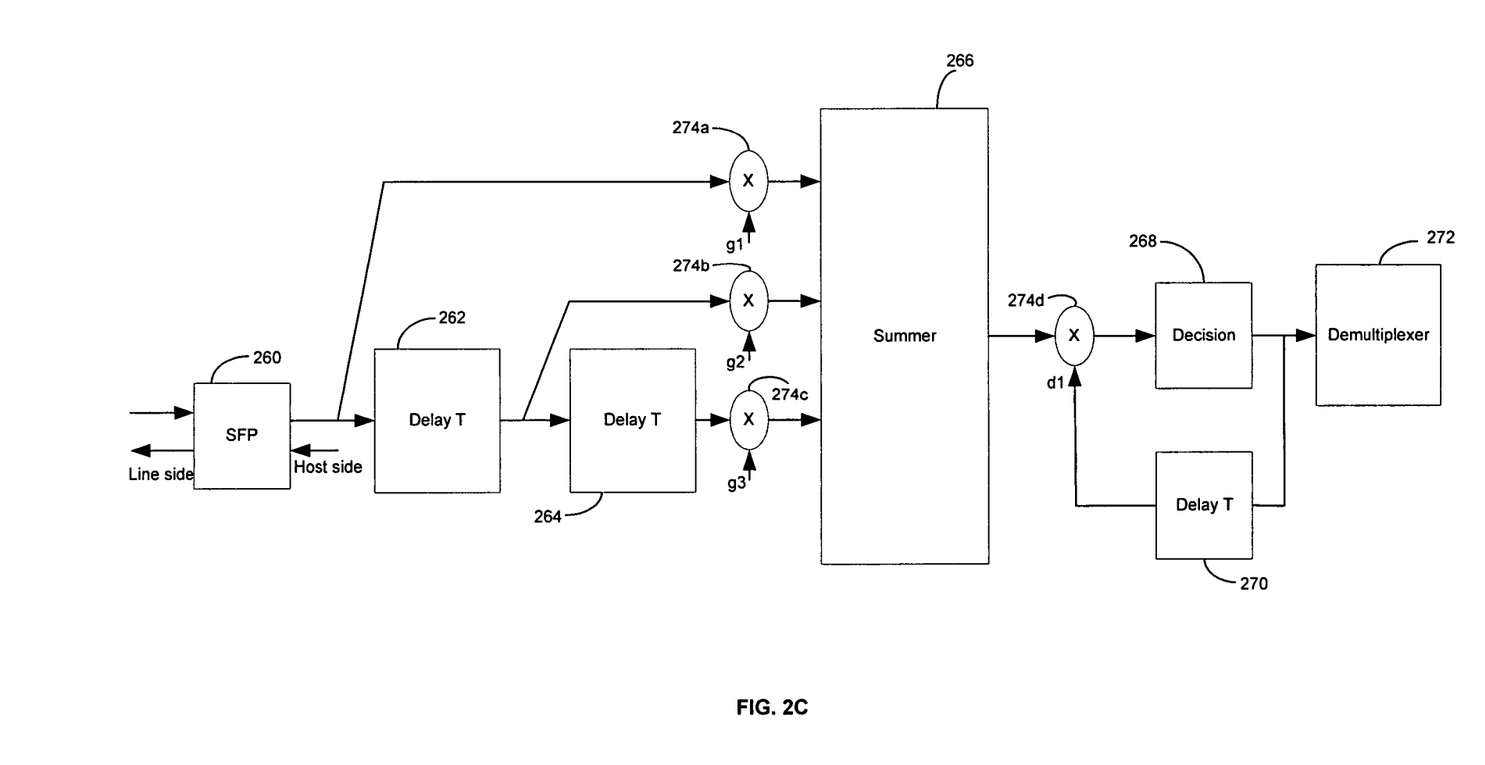
FIG. 2C is a block diagram illustrating an equalizer architecture, which may be utilized in a SerDes, in accordance with an embodiment of the invention.

FIG. 2C is a block diagram illustrating an equalizer architecture, which may be utilized in a SerDes, in accordance with an embodiment of the invention. Referring to FIG. 2C, there is shown a SFP 260, a plurality of delay blocks 262, 264 and 270, a plurality of multipliers 274a, 274b, 274c and 274d, a summer block 266, a decision block 268 and a demultiplexer 272.

The SFP 260 may comprise suitable logic and/or circuitry that may be adapted to receive an input signal from the optical path on the line side and generate an electrical signal to the host SerDes 204 on the host side. The plurality of delay blocks 262, 264 and 270 may comprise suitable logic, circuitry and/or code that may be adapted to delay an incoming signal by at least one time period T. The plurality of multipliers 274a, 274b and 274c may comprise suitable logic, circuitry and/or code that may be adapted to receive a plurality of signals and generate a multiplied output of the received signals to the summer block 266. The summer block 266 may comprise suitable logic, circuitry and/or code that may be adapted to sum the received signals from the plurality of multipliers 274a, 274b and 274c and generate an output to the multiplier 274d. The multiplier 274d may comprise suitable logic, circuitry and/or code that may be adapted to receive a plurality of signals from the summer block 266 and the delay block 270 and generate an output to the decision block 268. The decision block 268 may comprise suitable logic, circuitry and/or code that may be adapted to receive an input signal from the multiplier 274d and generate an output to the demultiplexer 272. The delay block 270 may in the feedback path from the output of the decision block 268 and the input of the multiplier 274d. The output d of the delay block 270 may be an input to the multiplier 274d.

The received signal from the optical path with intersymbol interference (ISI) may be processed to retrieve lost data due to dispersion loss and channel ISI. A decision feedback equalizer (DFE) may be utilized to recover lost data, for example. The DFE may comprise a feed-forward filter that may be adapted to filter the received signals. The DFE may comprise a feedback filter that may be adapted to filter previously received symbols and cancel their impact on the output of the feed-forward filter. The feed-forward filtered signals and the feedback filtered signals may be combined and input to the decision block 268. The decision block 268 may be adapted to make decisions on a symbol by symbol basis.

Figure 2D:
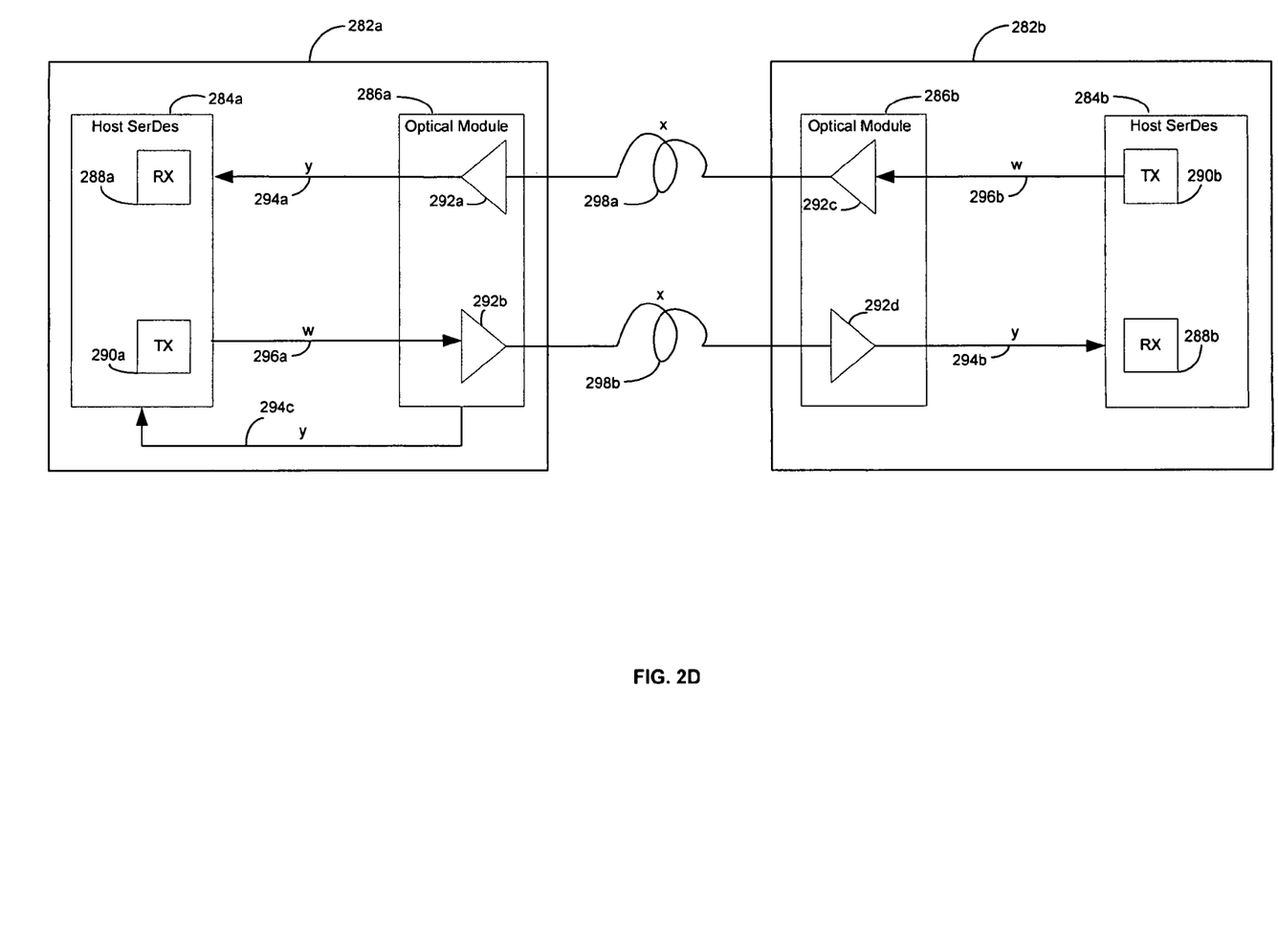
FIG. 2D is a block diagram illustrating looping back the electrical receive path to calculate dispersion loss in an optical communication circuit, in accordance with an embodiment of the invention.

FIG. 2D is a block diagram illustrating looping back the electrical receive path to calculate dispersion loss in an optical communication circuit, in accordance with an embodiment of the invention. Referring to FIG. 2D, there is shown a plurality of host boards 282a and 282b, a forward optical path x 298a and a reverse optical path x 298b. The host board 282a comprises a host Serializer-Deserializer (SerDes) 284a, an optical module 286a, a forward electrical transmit path w 296a, a reverse electrical receive path y 294a and a reverse electrical receive path y 294c. The host board 282a and/or host board 282b may be coated with a trace material, for example, 8"-12" FR4 trace material. The host SerDes 284a comprises a receiver RX 288a and a transmitter TX 290a. The optical module 286a comprises a plurality of optical amplifiers 292a and 292b. The host board 282b comprises a host SerDes 284b, an optical module 286b, a reverse electrical transmit path w 296b and a forward electrical receive path y 294b. The host SerDes 284b comprises a receiver RX 288b and a transmitter TX 290b. The optical module 286a comprises a plurality of optical amplifiers 292c and 292d.

The blocks in FIG. 2D may be defined similar to the blocks defined in FIG. 1. The host SerDes 284a may be adapted to loop back the electrical transmit path w 296a of the transmitter TX 290a through the optical module 286a coupled to the electrical transmit path w 296a back to the host SerDes 284a via the reverse electrical receive path y 294c, if the dispersion loss along the electrical transmit path w 296a of the transmitter TX 290a is similar to the dispersion loss along the electrical receive path y 294b of the receiver RX 288b.

Figure 3A:
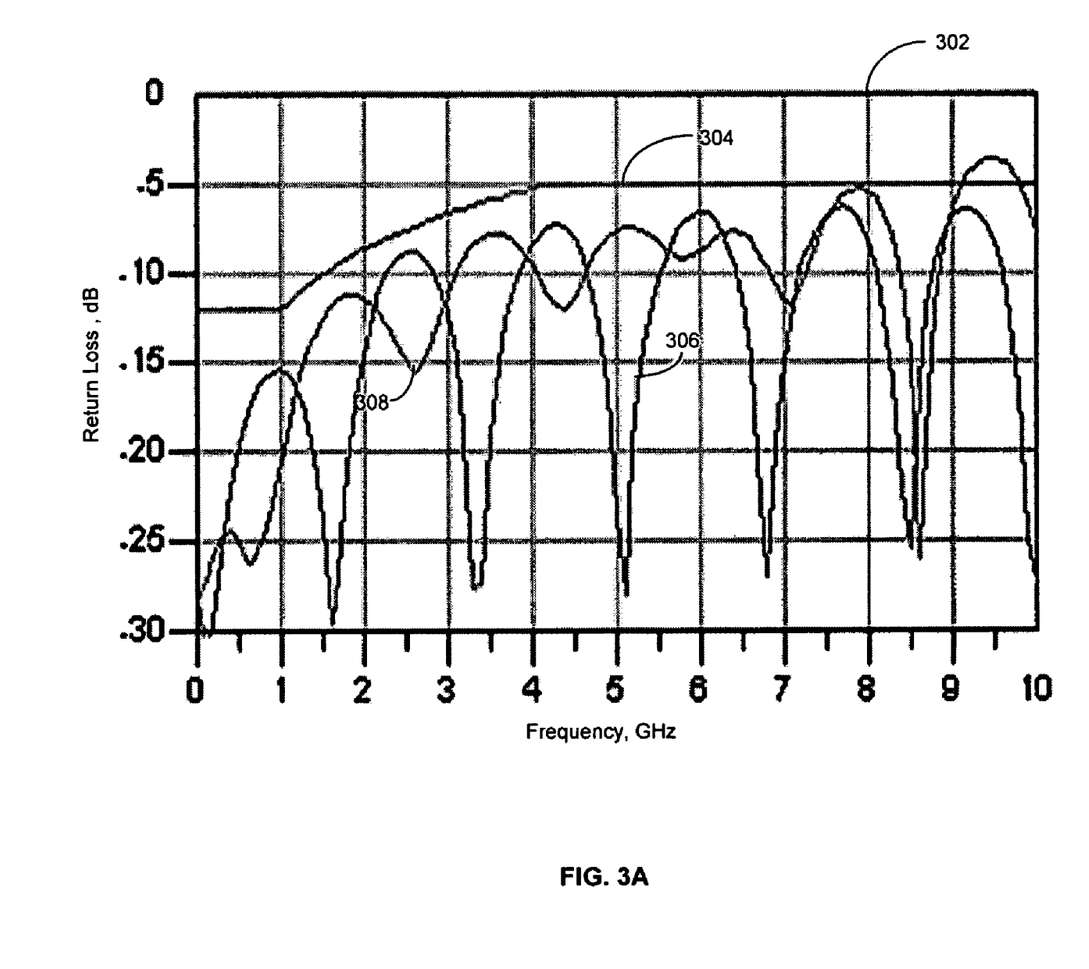
FIG. 3A is a graph illustrating return loss with connector for a 40 mm microstrip transmission line (MSTL), in accordance with an embodiment of the invention.

FIG. 3A is a graph 302 illustrating mask return loss with connector waveform 304, return loss waveform 306 and SDD1 waveform 308 for a 40 mm microstrip transmission line (MSTL), in accordance with an embodiment of the invention. The return loss with connector for the waveforms 304, 306 and 308 are based on a ball grid array (BGA) package with 2×0.5 picofarad (pf) of electrostatic discharge (ESD) diode with a 40 mm microstrip transmission line (MSTL), for example. There are around seven peaks and troughs in the return loss waveform 306, for example. The number of peaks and troughs for a 40 mm microstrip transmission line (MSTL) are greater than the number of peaks and troughs for a 250 mm microstrip transmission line (MSTL). The number of multiple reflections for a 40 mm microstrip transmission line (MSTL) is greater than the number of multiple reflections for a 250 mm microstrip transmission line (MSTL) due to line attenuation. The return loss for a 40 mm microstrip transmission line (MSTL) may be around −7 dB, for example.

Figure 3B:
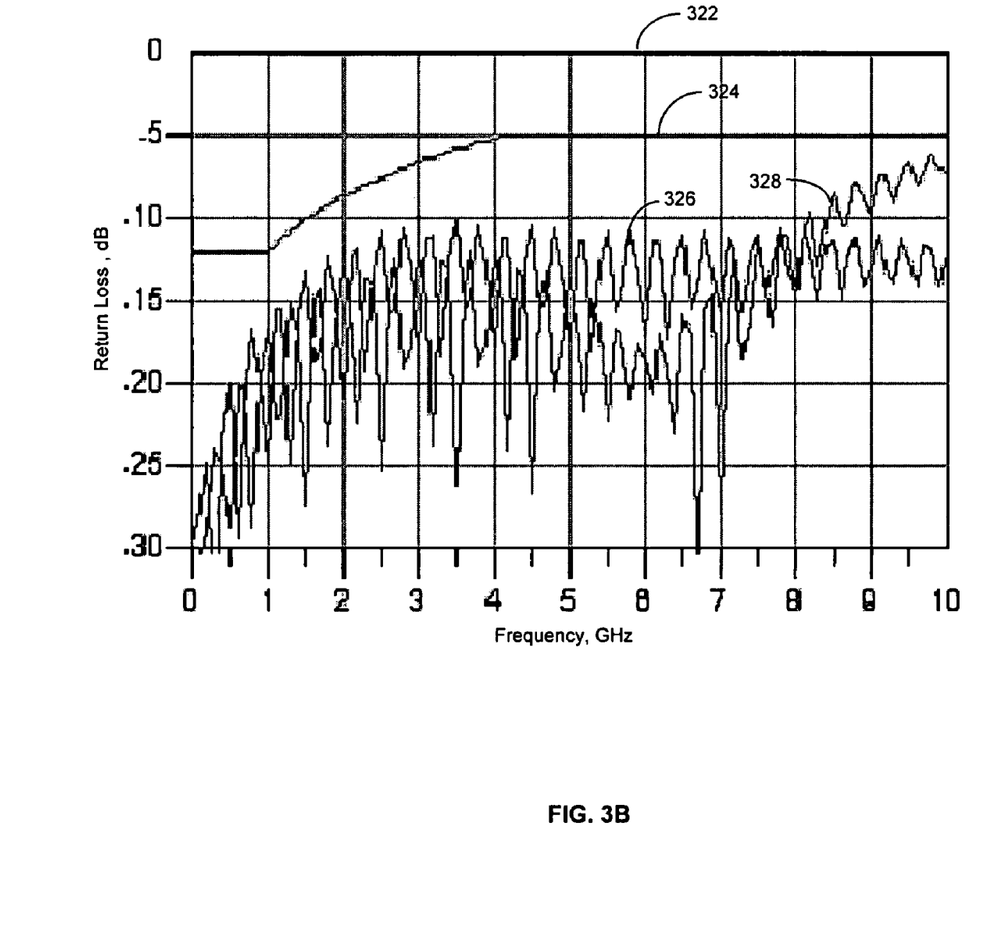
FIG. 3B is a graph illustrating return loss with connector for a 250 mm MSTL, in accordance with an embodiment of the invention.

FIG. 3B is a graph 322 illustrating mask return loss with connector waveform 324, return loss waveform 326 and SDD1 waveform 328 for a 250 mm microstrip transmission line (MSTL), in accordance with an embodiment of the invention. The return loss with connector for the waveforms 324, 326 and 328 are based on a ball grid array (BGA) package with 2×0.5 picofarad (pf) of electrostatic discharge (ESD) diode with a 250 mm microstrip transmission line (MSTL), for example. The return loss for 250 mm microstrip transmission line (MSTL) may be around −11 dB, for example. The host SerDes 204 (FIG. 2A) may be adapted to insert a loss into the first electrical path to reduce an effect of multiple reflections between the host SerDes 204 and the high speed optical module 206. The host SerDes 204 may be adapted to utilize passive attenuation to reduce the effect of multiple reflections between the host SerDes 204 and the high-speed optical module 206.

Figure 4A:
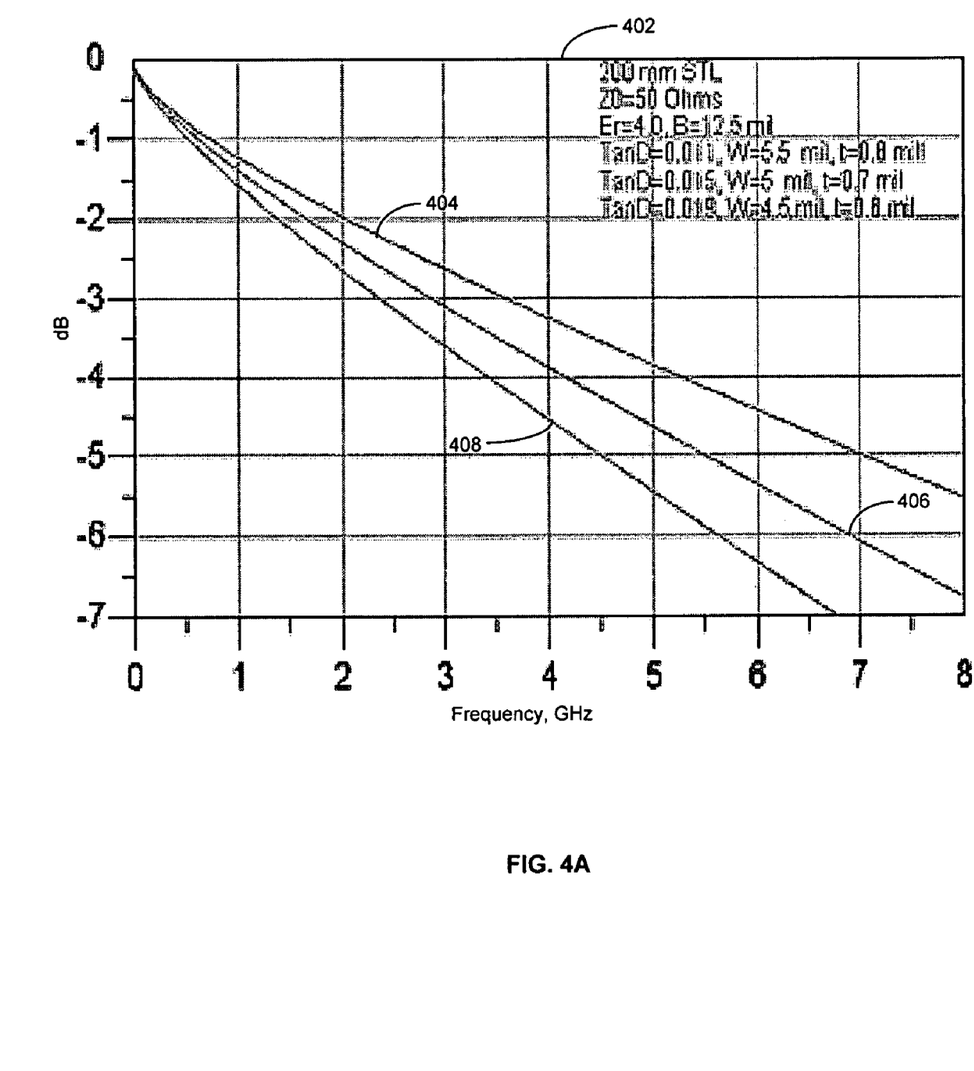
FIG. 4A is a graph illustrating loss tangent with connector for a 200 mm stripline (STL), in accordance with an embodiment of the invention.

FIG. 4A is a graph 402 illustrating loss tangent waveforms with connector for a 200 mm stripline (STL), in accordance with an embodiment of the invention. The 200 mm stripline may have an impedance Z0=50 ohms, thickness of dielectric B=12.5 mil and a dielectric constant $\in_r$=4.0, for example. The loss tangent waveform 404 may have a loss tangent Tan δ=0.011 and may be generated for a stripline with width w=5.5 mil, thickness t=0.8 mil, for example. The loss tangent waveform 406 may have a loss tangent Tan δ=0.015 and may be generated for a stripline with width w=5 mil, thickness t=0.7 mil, for example. The loss tangent waveform 408 may have a loss tangent Tan δ=0.019 and may be generated for a stripline with width w=4.5 mil, thickness t=0.6 mil, for example.

Figure 4B:
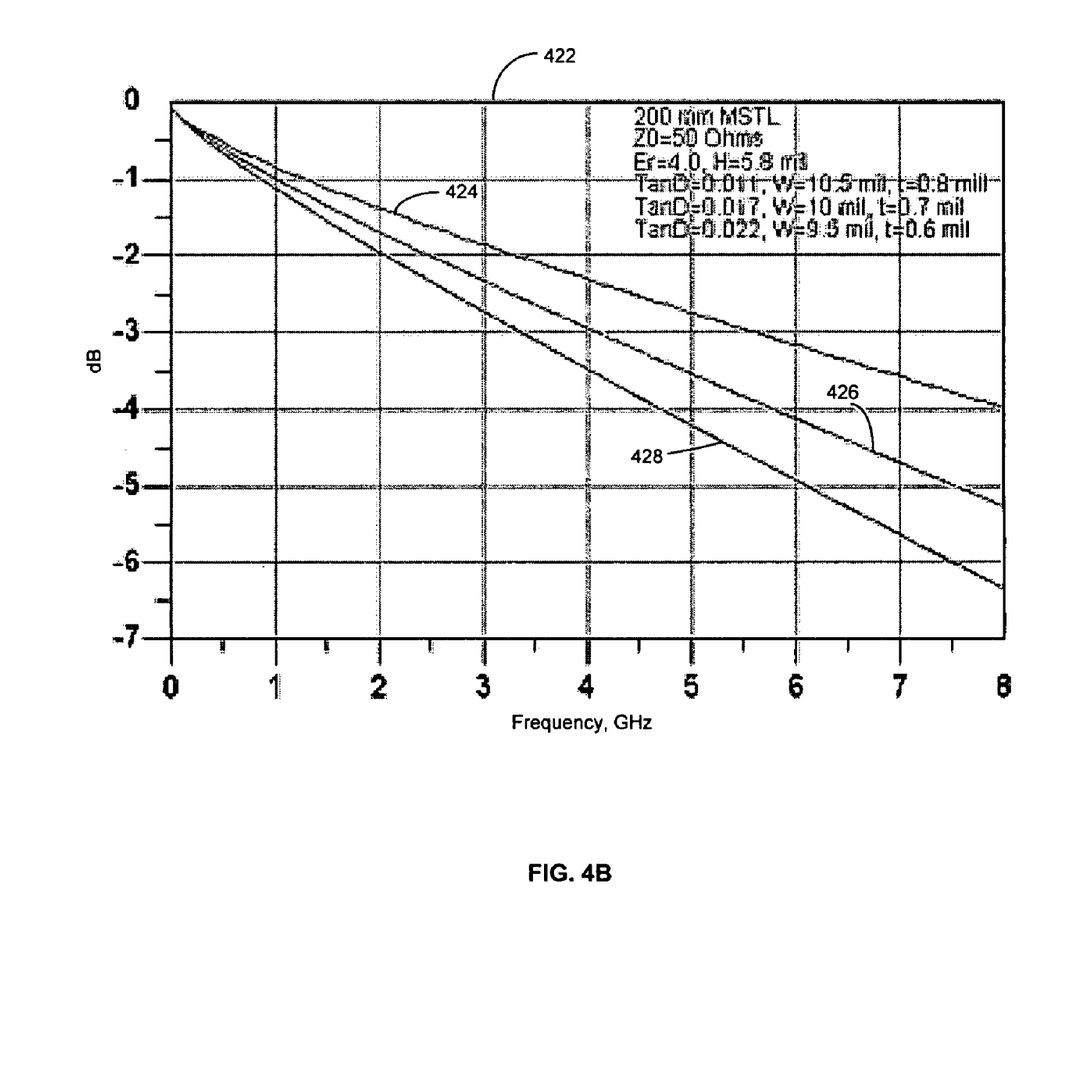
FIG. 4B is a graph illustrating loss tangent with connector for a 200 mm microstrip transmission line (MSTL), in accordance with an embodiment of the invention.

FIG. 4B is a graph 422 illustrating loss tangent waveforms with connector for a 200 mm microstrip transmission line (MSTL), in accordance with an embodiment of the invention. The 200 mm microstrip transmission line (MSTL) may have an impedance Z0=50 ohms, height of dielectric H=5.8 mil and a dielectric constant $\in_r$=4.0, for example. The loss tangent waveform 424 may have a loss tangent Tan δ=0.011 and may be generated for a stripline with width w=10.5 mil, thickness t=0.8 mil, for example. The loss tangent waveform 426 may have a loss tangent Tan δ=0.017 and may be generated for a stripline with width w=10 mil, thickness t=0.7 mil, for example. The loss tangent waveform 428 may have a loss tangent Tan δ=0.022 and may be generated for a stripline with width w=9.5 mil, thickness t=0.6 mil, for example.

Environmental variation may dominate the loss variation as the loss tangent may vary from about 0.011-0.022, for example. This variation in loss tangent may be utilized to categorize the applied pre-emphasis. A minimum loss of 3 dB, for example, may be able to reduce multiple reflections.

Figure 5A:
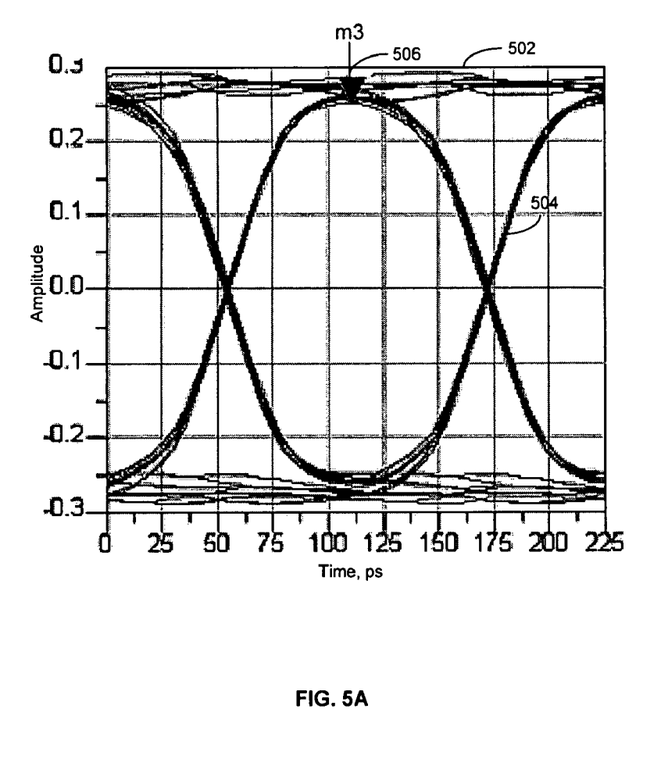
FIG. 5A is a graph illustrating an eye diagram for a 25 mm trace length at 8.5 GHz over SFP, in accordance with an embodiment of the invention.
Figure 5B:
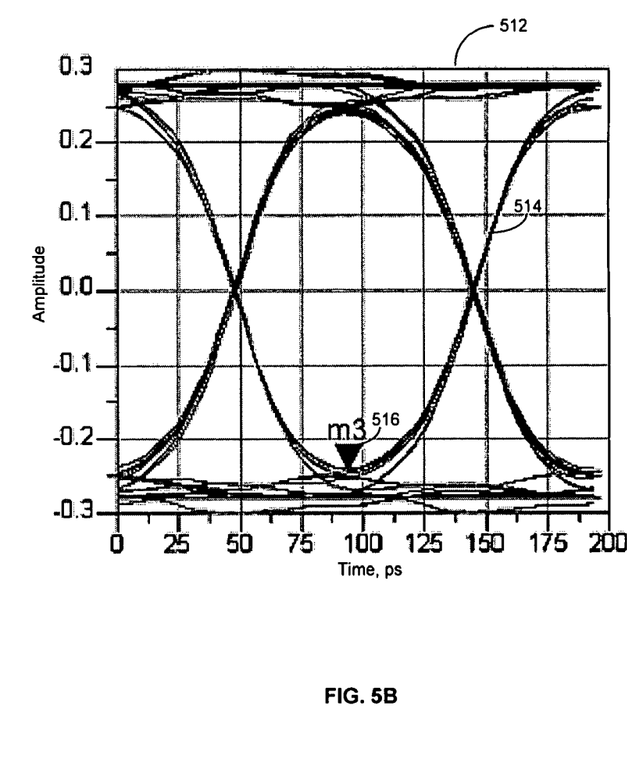
FIG. 5B is a graph illustrating an eye diagram for a 25 mm trace length at 10.3 GHz over SFP, in accordance with an embodiment of the invention.

Figures FIG. 5A through FIG. 5F are graphs illustrating eye diagrams for a plurality of different trace lengths. In particular, FIG. 5A is a graph 502 illustrating an eye diagram 504 for a 25 mm trace length at 8.5 GHz over SFP, in accordance with an embodiment of the invention. The graph 502 comprises a marker m3 506 that represents the reciprocal of the frequency of operation, 8.5 GHz at about 117 ps. A saw tooth waveform may be input on the X-axis, while the resultant output waveform may be generated on the Y-axis. FIG. 5B is a graph 512 illustrating an eye diagram 514 for a 25 mm trace length at 10.3 GHz over SFP, in accordance with an embodiment of the invention. The graph 512 comprises a marker m3 516 that represents the reciprocal of the frequency of operation, 10.3 GHz at about 97 ps. A saw tooth waveform may be input on the X-axis, while the resultant output waveform may be generated on the Y-axis. There is an increase in channel ISI for a 25 mm trace length at 10.3 GHz over SFP compared to a 25 mm trace length at 8.5 GHz over SFP.

Figure 5C:
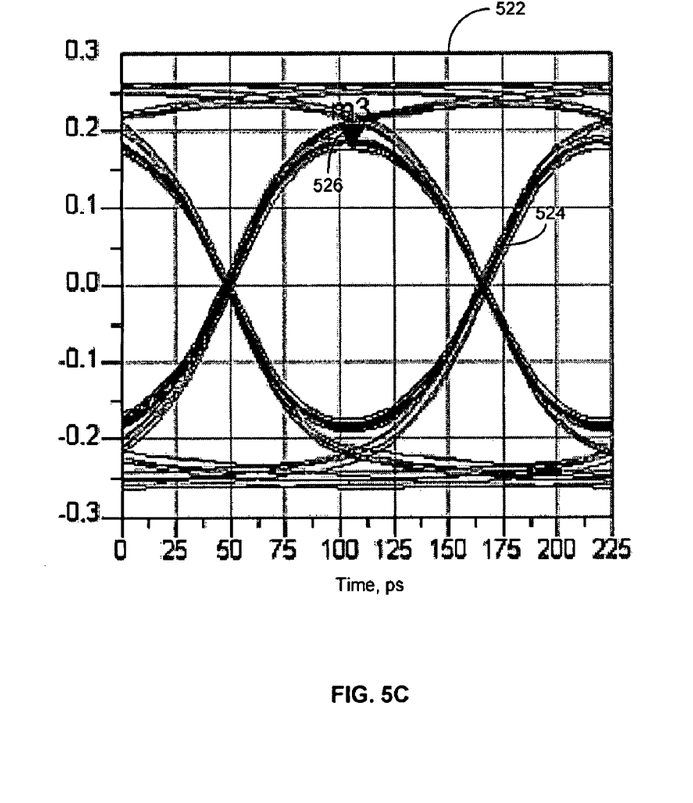
FIG. 5C is a graph illustrating an eye diagram for a 200 mm trace length at 8.5 GHz over SFP, in accordance with an embodiment of the invention.
Figure 5D:
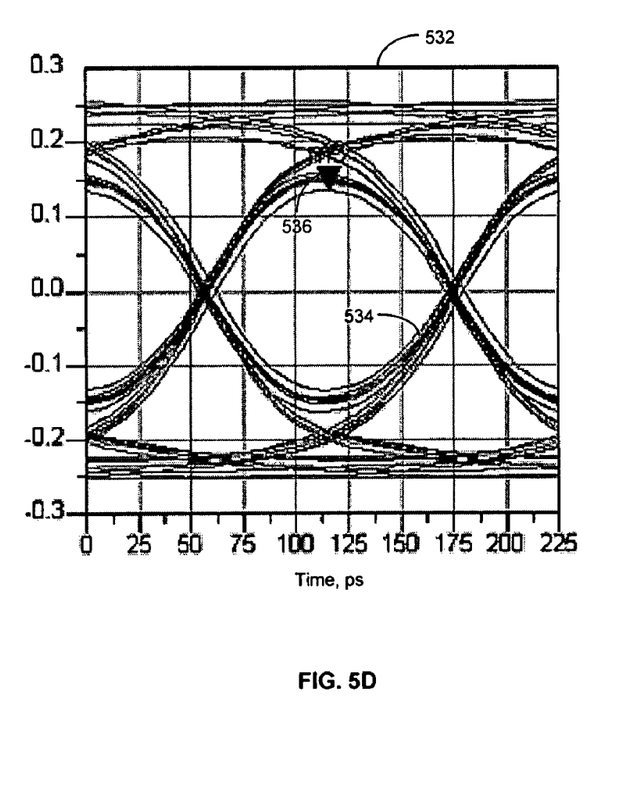
FIG. 5D is a graph illustrating an eye diagram for a 300 mm trace length at 8.5 GHz over SFP, in accordance with an embodiment of the invention.

FIG. 5C is a graph 522 illustrating an eye diagram 524 for a 200 mm trace length at 8.5 GHz over SFP, in accordance with an embodiment of the invention. The graph 522 comprises a marker m3 526 that represents the reciprocal of the frequency of operation, 8.5 GHz at about 117 ps. FIG. 5D is a graph 532 illustrating an eye diagram 534 for a 300 mm trace length at 8.5 GHz over SFP, in accordance with an embodiment of the invention. The graph 532 comprises a marker m3 536 that represents the reciprocal of the frequency of operation, 8.5 GHz at about 117 ps. The closure of the eye diagram 534 represents increased dispersion losses for a 300 mm trace length at 8.5 GHz over SFP compared to for a 200 mm trace length at 8.5 GHz over SFP.

Figure 5E:
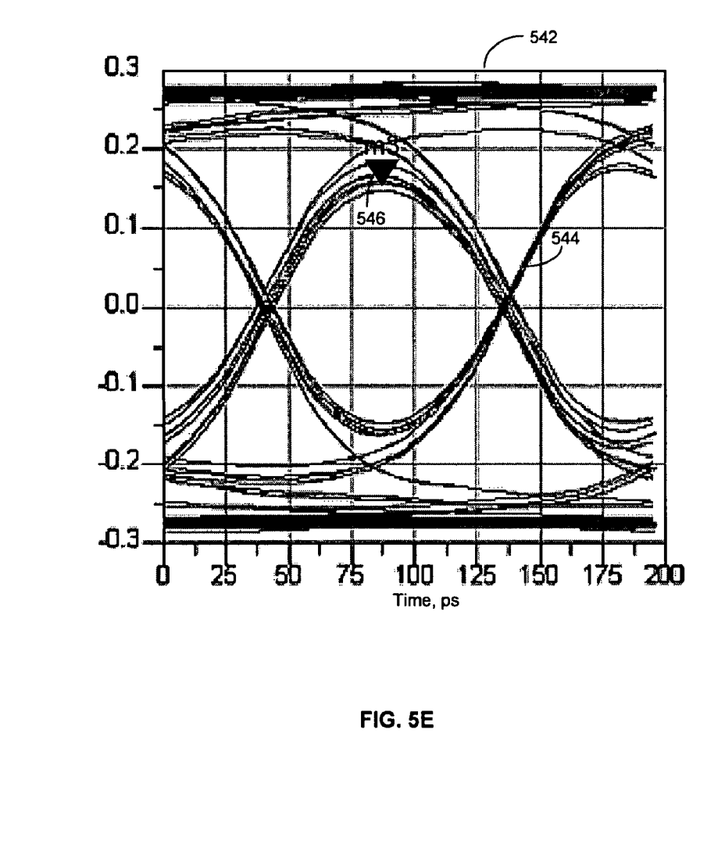
FIG. 5E is a graph illustrating an eye diagram for a 200 mm trace length at 10.3 GHz over SFP, in accordance with an embodiment of the invention.
Figure 5F:
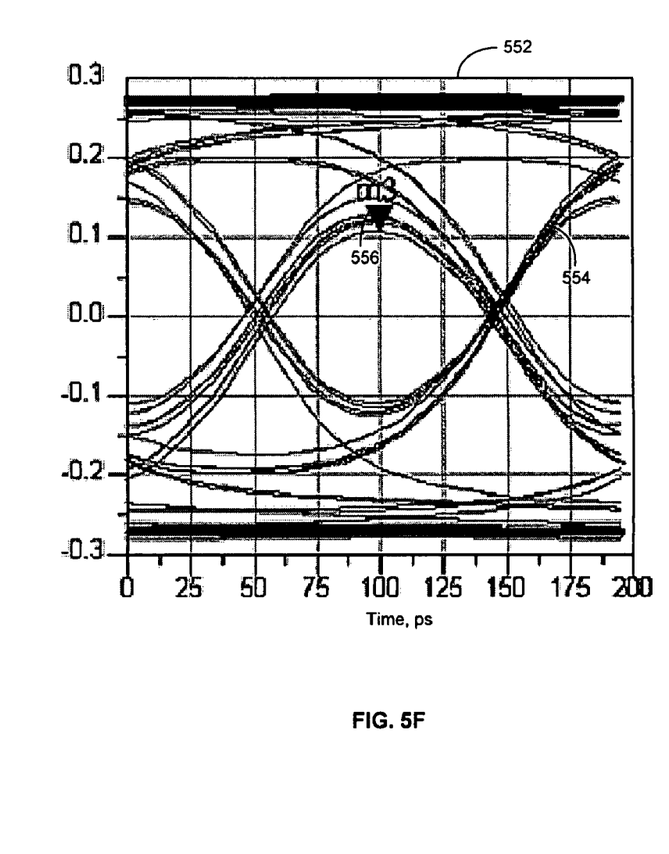
FIG. 5F is a graph illustrating an eye diagram for a 300 mm trace length at 10.3 GHz over SFP, in accordance with an embodiment of the invention.

FIG. 5E is a graph 542 illustrating an eye diagram 544 for a 200 mm trace length at 10.3 GHz over SFP, in accordance with an embodiment of the invention. The graph 542 comprises a marker m3 546 that represents the reciprocal of the frequency of operation, 10.3 GHz at about 97 ps. FIG. 5F is a graph 552 illustrating an eye diagram 554 for a 300 mm trace length at 10.3 GHz over SFP, in accordance with an embodiment of the invention. The graph 552 comprises a marker m3 556 that represents the reciprocal of the frequency of operation, 10.3 GHz at about 97 ps. The closure of the eye diagram 554 represents increased dispersion losses for a 300 mm trace length at 10.3 GHz over SFP compared to for a 200 mm trace length at 10.3 GHz over SFP. The increased dispersion losses reduce the signal to noise ratio (SNR).

Referring to FIG. 5A through FIG. 5F, the respective eye diagrams 504, 514, 524, 534, 544 and 554 illustrate that for a trace length over 40 mm, the jitter may increase due to multiple reflection. The eye diagrams 504, 514, 524, 534, 544 and 554 illustrate signal degradation as trace length increases. In particular, for trace lengths over 200 mm, there is a noticeable increase in signal degradation. This degradation of the signal may increase due to channel ISI and may be improved by applying pre-emphasis.

Figure 6:
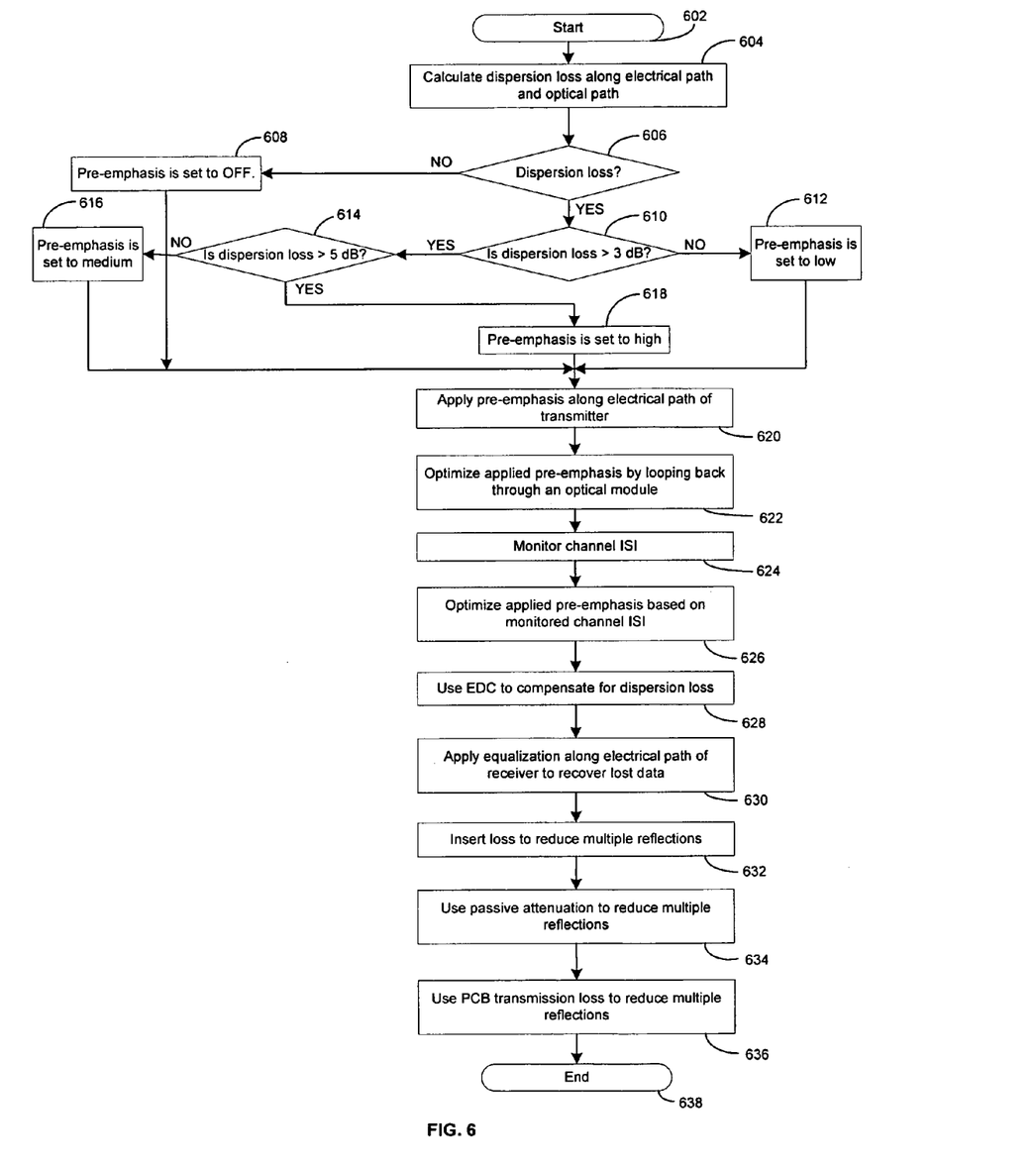
FIG. 6 is a flowchart illustrating optimum channel equalization from a SerDes to an optical module, in accordance with an embodiment of the invention.

FIG. 6 is a flowchart illustrating optimum channel equalization from a SerDes to an optical module, in accordance with an embodiment of the invention. Referring to FIG. 6, exemplary steps may start at step 602. In step 604, the dispersion loss along the electrical and/or optical paths may be calculated. In step 606, it may be determined whether any dispersion loss along the electrical and/or optical paths exists. If there is no dispersion loss along the electrical or optical paths, control passes to step 608. In step 608, the pre-emphasis is set to OFF if there is if there is no dispersion loss along the electrical and/or optical paths. Control then passes to step 620. If there is dispersion loss along the electrical and/or optical path, control passes to step 610. In step 610, it may be determined whether the calculated dispersion loss along the electrical and/or optical paths is greater than about 3 dB, for example. If the calculated dispersion loss is not greater than about 3 dB, control passes to step 612. In step 612, the pre-emphasis is set to LOW. Control then passes to step 620. If the calculated dispersion loss along the electrical and/or optical paths is greater than about 3 dB, control passes to step 614. In step 614, it may be determined whether the calculated dispersion loss along the electrical and/or optical paths is greater than about 5 dB, for example. If the calculated dispersion loss along the electrical and/or optical paths is greater than about 5 dB, control passes to step 618. In step 618, the pre-emphasis may be set to HIGH. Control then passes to step 620. If the calculated dispersion loss along the electrical and/or optical paths is not greater than about 5 dB, control passes to step 616. In step 616, the pre-emphasis may be set to MEDIUM. Control then passes to step 620.

In step 620, the pre-emphasis may be applied along the electrical path of the transmitter. In step 622, the applied pre-emphasis may be optimized by looping back the electrical path through an optical module back to the host SerDes, if the dispersion loss along the transmit electrical path is similar to the dispersion loss along the receive electrical path. In step 624, the host SerDes may monitor the channel inter-symbol interference (ISI) along at least one of the transmit electrical path and the receive electrical path. In step 626, the host SerDes may be adapted to optimize the applied pre-emphasis based on the monitored channel ISI. In step 628, electronic dispersion compensation (EDC) may be utilized to compensate for the dispersion loss along the electrical path and the optical path. In step 630, equalization may be applied along the electrical path of a receiver to recover lost data due to the dispersion loss and channel ISI. In step 632, the host SerDes may be adapted to insert a loss into the electrical path to reduce an effect of multiple reflections between the host SerDes and an optical module. In step 634, the host SerDes may be adapted to utilize passive attenuation to reduce the effect of multiple reflections between the host SerDes and the optical module. In step 636, the host SerDes may adapted to utilize a printed circuit board (PCB) transmission loss to reduce the effect of multiple reflections between the host SerDes and the optical module. Control then passes to end step 638.

In accordance with an embodiment of the invention, a system for optical communication may comprise circuitry that reduces dispersion loss along an electrical transmit path of a transmitter and an optical transmit path coupled to the transmitter via pre-emphasis. The system may comprise circuitry that improves signal quality along the electrical transmit path of the transmitter and the optical transmit path coupled to the transmitter by equalizing signals received via an electrical receive path of a receiver communicatively coupled to the transmitter.

The system may comprise circuitry that may be adapted to categorize the dispersion loss along the electrical transmit path of the transmitter and the optical transmit path coupled to the transmitter to determine a level of the pre-emphasis. The system may comprise circuitry that may be adapted to determine the dispersion loss along the electrical transmit path of the transmitter and dispersion loss along the electrical receive path of the receiver. The system may comprise circuitry that may be adapted to loop back the electrical transmit path of the transmitter through an optical module coupled to the electrical transmit path back to a host Serializer-Deserializer (SerDes), if the dispersion loss along the electrical transmit path of the transmitter is similar to the dispersion loss along the electrical receive path of the receiver.

The system may comprise circuitry that may be adapted to determine a level of the pre-emphasis based on channel inter-symbol interference (ISI) along at least one of: the electrical transmit path of the transmitter and the electrical receive path of the receiver. The system may comprise circuitry that may be adapted to adjust the determined level of pre-emphasis based on the channel ISI. The system may comprise circuitry that may be adapted to compensate for the dispersion loss along the electrical transmit path of the transmitter and the optical transmit path coupled to the transmitter utilizing electronic dispersion compensation.

The system may comprise circuitry that may be adapted to insert a loss into the electrical transmit path of the transmitter to mitigate effects of multiple reflections between a host Serializer-Deserializer (SerDes) and an optical module. The system may comprise circuitry that may be adapted to mitigate the effects of the multiple reflections between the host Serializer-Deserializer (SerDes) and the optical module utilizing a printed circuit board (PCB) transmission path loss. The system may comprise circuitry that may be adapted to mitigate the effects of the multiple reflections between the host Serializer-Deserializer (SerDes) and the optical module utilizing passive attenuation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for optical communication, the method comprising:
    reducing dispersion loss along an electrical transmit path of a transmitter and an optical transmit path coupled to said transmitter via pre-emphasis;
    improving signal quality along said electrical transmit path of said transmitter and said optical transmit path coupled to said transmitter by equalizing signals received via an electrical receive path of a receiver communicatively coupled to said transmitter;
    determining said dispersion loss along said electrical transmit path of said transmitter;
    determining dispersion loss along said electrical receive path of said receiver; and
    if said dispersion loss along said electrical transmit path of said transmitter is similar to said dispersion loss along said electrical receive oath of said receiver, looping back said electrical transmit oath of said transmitter through an optical module coupled to said electrical transmit path back to a host Serializer-Deserializer (SerDes).

2. The method according to claim 1, comprising categorizing said dispersion loss along said electrical transmit path of said transmitter and said optical transmit path coupled to said transmitter to determine a level of said pre-emphasis.

3. The method according to claim 1, comprising determining a level of said pre-emphasis based on channel inter-symbol interference (ISI) along at least one of: said electrical transmit path of said transmitter and said electrical receive path of said receiver.

4. The method according to claim 3, comprising adjusting said determined level of said pre-emphasis based on said channel ISI.

5. The method according to claim 1, comprising compensating for said dispersion loss along said electrical transmit path of said transmitter and said optical transmit path coupled to said transmitter utilizing electronic dispersion compensation.

6. The method according to claim 1, comprising inserting a loss into said electrical transmit path of said transmitter to mitigate effects of multiple reflections between a host Serializer-Deserializer (SerDes) and an optical module.

7. The method according to claim 6, comprising mitigating said effects of said multiple reflections between said host Serializer-Deserializer (SerDes) and said optical module utilizing a printed circuit board (PCB) transmission path loss.

8. The method according to claim 6, comprising mitigating said effects of said multiple reflections between said host Serializer-Deserializer (SerDes) and said optical module utilizing passive attenuation.

9. A system for optical communication, the system comprising:
one or more circuits that enables reduction of dispersion loss along an electrical transmit path of a transmitter and an optical transmit path coupled to said transmitter via pre-emphasis;
said one or more circuits enables improvement of signal quality along said electrical transmit path of said transmitter and said optical transmit path coupled to said transmitter by equalizing signals received via an electrical receive path of a receiver communicatively coupled to said transmitter;
said one or more circuits enables determination of said dispersion loss along said electrical transmit path of said transmitter;
said one or more circuits enables determination of dispersion loss along said electrical receive path of said receiver; and
wherein said one or more circuits enables looping back of said electrical transmit path of said transmitter through an optical module coupled to said electrical transmit path back to a host Serializer-Deserializer (SerDes), if said dispersion loss along said electrical transmit path of said transmitter is similar to said dispersion loss along said electrical receive path of said receiver.

10. The system according to claim 9, wherein said one or more circuits enables categorization of said dispersion loss along said electrical transmit path of said transmitter and said optical transmit path coupled to said transmitter to determine a level of said pre-emphasis.

11. The system according to claim 9, wherein said one or more circuits enables determination of a level of said pre-emphasis based on channel inter-symbol interference (ISI) along at least one of: said electrical transmit path of said transmitter and said electrical receive path of said receiver.

12. The system according to claim 11, wherein said one or more circuits enables adjustment of said determined level of said pre-emphasis based on said channel ISI.

13. The system according to claim 9, wherein said one or more circuits enables compensation for said dispersion loss along said electrical transmit path of said transmitter and said optical transmit path coupled to said transmitter utilizing electronic dispersion compensation.

14. The system according to claim 9, wherein said one or more circuits enables insertion of a loss into said electrical transmit path of said transmitter to mitigate effects of multiple reflections between a host Serializer-Deserializer (SerDes) and an optical module.

15. The system according to claim 14, wherein said one or more circuits enables mitigation of said effects of said multiple reflections between said host Serializer-Deserializer (SerDes) and said optical module utilizing a printed circuit board (PCB) transmission path loss.

16. The system according to claim 14, wherein said one or more circuits enables mitigation of said effects of said multiple reflections between said host Serializer-Deserializer (SerDes) and said optical module utilizing passive attenuation.

* * * * *